United States Patent
Lee et al.

(10) Patent No.: US 6,996,415 B2
(45) Date of Patent: Feb. 7, 2006

(54) SYSTEM AND METHOD FOR TRANSMITTING DATA ON A REVERSE LINK CHANNEL

(75) Inventors: Young Jo Lee, Kyongki-Do (KR); Jong Hoe An, Kyongki-Do (KR); Suk Hyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 10/124,243

(22) Filed: Apr. 18, 2002

(65) Prior Publication Data

US 2002/0155853 A1   Oct. 24, 2002

(30) Foreign Application Priority Data

Apr. 20, 2001   (KR)   ............................. 2001-21273
Jun. 9, 2001    (KR)   ............................. 2001-32352

(51) Int. Cl.
    *H04B 7/00*    (2006.01)
(52) U.S. Cl. .................. 455/522; 455/453; 455/452.2
(58) Field of Classification Search ............. 455/522, 455/69, 67.3, 453, 450, 452.1, 512, 452.2; 370/329
    See application file for complete search history.

(56) References Cited

U.S. PATENT DOCUMENTS

| | | | |
|---|---|---|---|
| 6,101,179 A * | 8/2000 | Soliman ..................... | 370/342 |
| 6,385,462 B1 * | 5/2002 | Baum et al. ................ | 455/522 |
| 2002/0036992 A1 * | 3/2002 | Balachandran et al. ..... | 370/329 |
| 2002/0085641 A1 * | 7/2002 | Baum ........................ | 375/260 |
| 2002/0147022 A1 * | 10/2002 | Subramanian et al. ...... | 455/453 |
| 2003/0060224 A1 * | 3/2003 | Nelson et al. .............. | 455/522 |

* cited by examiner

*Primary Examiner*—Nay Maung
*Assistant Examiner*—Raymond S. Dean
(74) *Attorney, Agent, or Firm*—Fleshner & Kim, LLP

(57) ABSTRACT

For effective use of wireless channels and allowing high-speed data transfers on the reverse link in a mobile communications system, the modulation mode and/or the coding rate can be adaptively adjusted according to changes in the wireless channel conditions. To estimate the channel conditions, the mobile station transmits an access signal via an access channel to the base station. The base station determines a first data transmission rate based upon the signal power level of the access signal and an actual signal power level detected from the access channel, and also determines a second data transmission rate based upon a signal load detected at the base station. The base station selects the appropriate data transmission rate, and applies an adjusted modulation mode and/or channel coding.

34 Claims, 5 Drawing Sheets

SYSTEM AND METHOD FOR TRANSMITTING DATA ON A REVERSE LINK CHANNEL

FIELD OF THE INVENTION

The present invention generally relates to mobile communications, and in particular, to estimating the reverse link channel conditions to transmit data on the reverse link channel.

BACKGROUND OF THE INVENTION

Data communications involve the transmission and reception of voice, data packets, and other types of information via wireless, cellular and/or mobile techniques. Hereinafter, such techniques will be simply referred to as "mobile communications" merely for the sake of brevity.

Mobile communications involve, among various processing procedures, signal transmissions and handling of data traffic between an access network (AN) and an access terminal (AT). An access network (AN) comprises many elements, one of which being a base station, as known by those skilled in the art. An access terminal (AT) can be in many forms, including a mobile station (e.g., a mobile phone), a mobile terminal (e.g., a laptop computer), and other devices (e.g., a personal digital assistant: PDA) having the combined functionality of both a mobile station and a mobile terminal, or having other terminal capabilities. Hereinafter, an access terminal (AT) will be referred to as a "mobile" for the sake of brevity.

In a typical mobile communications system, a plurality of mobile stations (e.g., cellular/mobile phones, laptop computers, personal digital assistants (PDAs), etc.) are served by a network of base stations, which allow the mobile stations to communicate with other components in the communications system. Various types of mobile communications systems and standards are known, including cellular systems, Code Division Multiple Access (CDMA), Time Division Multiple Access (TDMA), Frequency Division Multiple Access (FDMA), Personal Communication Services (PCS), and various enhancements and improvements thereto which are generally referred to as next generation mobile communications systems (including Third Generation (3G), such as IMT-2000 (International Mobile Telecommunication 2000), and Fourth Generation (4G) mobile communications systems).

CDMA is most widely accepted and continues to develop and evolve. In particular, CDMA technology evolution (such as the so-called "cdma2000" technology or other next generation CDMA systems) will provide integrated voice with simultaneous high-speed packet data, video and video conferencing capabilities. For example, systems that are evolving from CDMA include High Data Rate (HDR) technologies, cdma2000 1×EV-DV (1×EVolution—Data and Voice) and 1×Evolution—Data Only (1×EV-DO) technologies and the like.

The present disclosure focuses on data transmission techniques between base stations and mobiles. Thus, a detailed description of additional components, elements and processing procedures (not specifically mentioned herein) have been omitted so that the features of the present invention are not obscured. One skilled in the art would have understood that various other components and techniques associated with base stations and mobiles already known in the art but not described in detail herein, are also part of the present invention. For example, specific details of the protocol architecture having an air interface with a layered structure, physical layer channels, protocol negotiation and processing, and the like have been omitted.

In a communications system, a set of "channels" allow signals to be transmitted between the access network (e.g., a base station) and the access terminal (e.g., a mobile) within a given frequency assignment. Channels consist of "forward channels" and "reverse channels." Signal transmissions (data transmissions or transfers) from the base station to a mobile via a downlink (i.e., forward channels) are commonly referred to as the "forward link," while signal transmissions from the mobile to the base station via an uplink (i.e., reverse channels) are commonly referred to as the "reverse link."

Typically, the forward link can comprise of a pilot channel ("pilot"), a synchronization signal channel ("sync"), a paging channel ("paging"), and a traffic channel ("traffic"). Here, a pilot signal on the pilot channel always has a constant transmission strength.

In mobile communications, the conditions of the wireless channels used All for data transmission (forward link and reverse link) often change due to the user's physical location and various mobility characteristics. There are several methods of achieving efficient use of wireless channels while allowing high-speed data transmission in a mobile communications environment. For adaptively accommodating communications environment changes in the channels, a method of changing the channel coding and a method of changing the modulation mode are known.

By using channel coding, information data is repeatedly coded to reduce error rates, and thus the amount of data transmitted on the wireless channel is increased by the repeated (redundant) data. Due to changes in the user's location and mobility, the mobile communications environment may be considered to be good or bad. When the mobile communications environment is good, coding with a high code rate having little redundancy is used to send a large amount of actual information data to increase transmission data speed. Also, when the mobile communications environment is bad, coding with a low code rate having high redundancy (being resistant to errors) is employed to allow a lower transmission data speed is used so that the transmission is resistant to noise.

For changing the modulation mode, when the mobile communications environment is good, a transmission method allowing high-speed data transmission, such as QAM (Quadrature Amplitude Modulation) or MPSK (Mary Phase Shift Keying) wherein a plurality of data bits for one transmission symbol are sent, is used. When the mobile communications environment is bad, a slow transmission method, such as BPSK (Binary Phase Shift Keying) is used despite its high level of interference noise.

Regarding the channel coding and/or the modulation mode, information that is fed back from the receiving end (e.g., the mobile in the forward link or the base station in the reverse link) is required to estimate the channel environment to be used in modifying the modulation mode and/or the channel coding.

For the reverse link, an open loop power control method is used during access procedures by the mobile. Typically, an open loop power control method refers to controlling the mobile transmit power when signals are transmitted from the mobile to the base station (i.e., on the reverse link). Namely, the transmit power of the mobile located relatively near a base station (or otherwise has a sufficient signal link with a base station) is made relatively low, while the transmit power of a mobile located relatively far from a base station (or otherwise has an insufficient signal link with a base station) is made relatively high. In this manner, the signals received by the base station from a mobile can be held relatively constant.

The open loop power control is related to the equation: Tx=constant−Rx, whereby, Tx is the transmission power strength of the mobile, and Rx is the power received from the base station (i.e., the pilot signal strength). Here, a relatively large Rx value indicates that the channel conditions are good (e.g., when the mobile is near the base station), and the Tx value is accordingly relatively small. Conversely, a relatively small Rx value indicates that the channel conditions are bad (e.g., when the mobile is far from the base station), and the Tx value is accordingly relatively large.

SUMMARY OF THE INVENTION

A gist of the present invention involves the recognition by the present inventors of the drawbacks in the conventional art. In particular, for the forward link, the channel environment can be estimated and detected using pilot signals that have constant signal strength. In contrast, there are no pilot signals having constant signal strength on the reverse link and thus the conventional channel environment estimation and detection techniques of the forward link cannot be applied to the reverse link to determine the channel environment required for modifying the modulation mode and/or the channel coding.

In particular, feedback information from the receiving end (i.e., a mobile) is necessary for detecting and/or estimating the channel environment and/or conditions to adaptively modify the modulation mode or the channel coding in accordance with the channel environment and/or conditions. On the forward link, because the strength of the pilot signals are constant, the channel environment and/or conditions can be detected and/or estimated by using the pilot signal strength (or intensity) (C/I) received and detected at a mobile. The mobile feeds back information of the detected and/or estimated pilot signal strength received thereof to its base station. Thereafter, the base station uses the thusly transmitted feedback information to allow signal communications (e.g., data transmissions) on the forward link.

However, there is no pilot signal or the like that is transmitted at a constant strength on the reverse link. Thus, the channel environment and/or conditions cannot be determined and/or estimated using pilot signals, and adaptive selection of the appropriate modulation mode or channel coding cannot be performed.

To address at least the above-identified conventional problems, the present inventors employ a modified open loop power control for estimating and determining the channel environment for the reverse link during the access procedures to advantageously establish an improved data link (i.e., a reverse link) between a mobile and a base station to achieve enhanced mobile communications.

For effective use of wireless channels and allowing high-speed data transfers on the reverse link in a mobile communications system, the modulation mode and/or the channel coding can be adaptively adjusted according to changes in the wireless channel conditions. To estimate the channel conditions, the mobile station transmits an access message via an access channel to the base station. The base station determines a first data transmission rate based upon the signal power level value of the access message (signal) and an actual message power level detected from the access channel, and also determines a second data transmission rate based upon a signal load detected at the base station. The base station selects the appropriate data transmission rate, and applies an adjusted modulation mode and/or channel coding.

A plurality of mobile stations can be handled by assigning priority levels to the mobile stations. By limiting the reverse link data transmission time period, many mobile stations can be handled and a large amount of data can be transmitted by each mobile station.

DETAILED DESCRIPTION OF THE PREFERRED EMBODIMENT

The present inventors realized that an adaptive modulation and coding method (AMC) cannot be applied to the reverse link, because there are no pilot signals having constant signal strength for the reverse link, and the base station cannot estimate the channel condition for the reverse link.

However, the present invention solves these problems by using a modified open loop power control method to determine the signal transmission power at the mobile and the determined transmission power is maintained during further processing. Namely, adaptive selection of an appropriate modulation mode or coding rate for effective data transmissions on the reverse link is achieved by using a technique for determining and/or estimating the channel environment and/or conditions so that signals are transmitted at a particular strength (i.e., intensity) during access attempts. This is achieved by modifying the conventional open power loop control method in the following manner.

During an access attempt, the strength of the transmission power is maintained to allow the base station to detect and/or estimate the channel environment and/or conditions on the reverse link. Here, it should be noted that an access attempt may be performed when a traffic channel between the mobile and the base station has not yet been established (e.g., the mobile is not in active state) or when a traffic channel has already been established (e.g., the mobile is in active state). If the mobile is already in an active state (e.g., a traffic channel is already established), data regarding the transmit power strength of a mobile can be sent on a reverse link control channel of a newly established channel.

Figure 1:
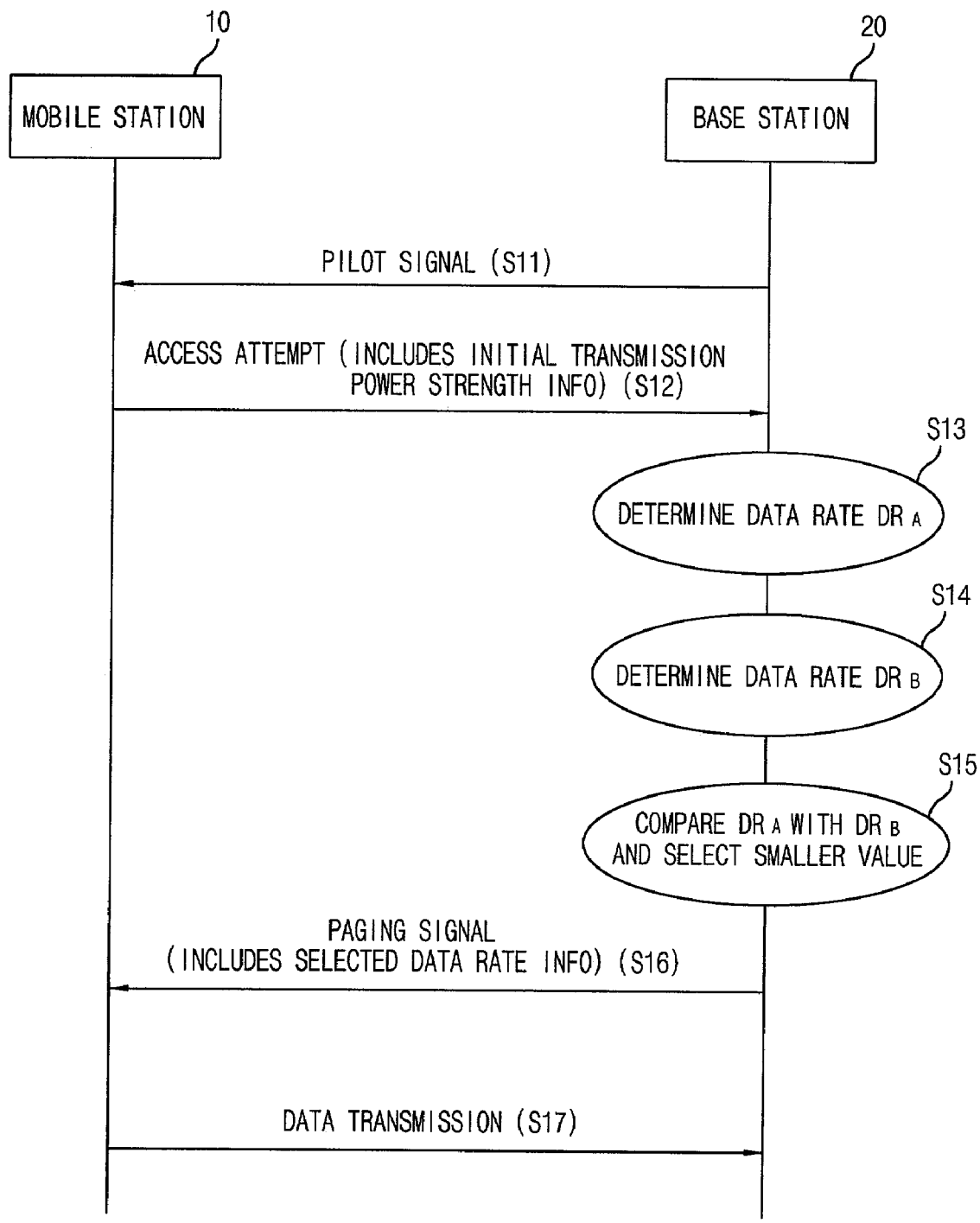
FIG. 1 shows the call processing procedures of a reverse link data (signal) transmission method according to the present invention.

FIG. 1 shows the procedures involved in call processing for adaptive modulation and coding methods on the reverse link.

The base station 20 can determine and/or estimate the channel environment and/or conditions using the received power intensity detected from the access channel itself, and using the transmission power intensity detected from the access message sent from the mobile 10.

In step S11, the base station 20 sends a pilot signal to the mobile 10, and the strength of this pilot signal is used to determine the initial transmission power strength of the mobile 10. In step S12, the mobile 10 sends to the base station 20, an access message containing the initial transmission power strength information of the mobile 10. Here, the initial transmission power strength can be determined by two methods.

The transmission power strength on the reverse link can be expressed as: Tx=constant−initial Rx, which is a modification of the equation related to the conventional open loop power control method. Here, Tx is the transmission power strength of the mobile, and initial Rx is the initial power received from the base station (i.e., the strength of the pilot signal sent by the base station).

The conventional open loop power control method resulted in a varying Tx value due to a continuously varying Rx value caused by changes in the mobile communications environment. However, in the present invention, the channel environment is estimated by setting (i.e., fixing) the Rx value to its initial value and thus the transmission power value Tx is fixed.

Alternatively, the transmission power strength Tx can be obtained using the above method, but a compensation value ($\alpha$) can be added thereto to obtain a further modified mobile transmission power intensity (strength). Thereafter, the transmission power intensity information is informed to the base station 20 using access messages sent thereto. Thus, according to the present invention the transmission power intensity on the reverse link can also be expressed as: Tx=constant−initial Rx+$\alpha$, with Tx being the transmission power strength of the mobile 10, initial Rx being the initial power received from the base station 20, and $\alpha$ being a compensation value.

Then in step S13, the base station 20 uses the initial transmission power strength information sent by the mobile 10 and the signal reception power strength that is actually detected from the access channel to determine a first possible data rate ($DR_A$) that can be used on the reverse link.

In step S14, a second possible data rate ($DR_B$) for the reverse link is determined by a load detector, such as a load controller or admission controller (not shown in FIG. 1) in the base station 20. The second data rate ($DR_B$) is obtained because the appropriate data rate for the reverse link may also depend upon the load at the base station 20 due to a large number of mobiles being in communication therewith.

Then in step S15, the base station 20 compares these two data rates ($DR_A$ and $DR_B$) and sets the smaller of the two as the final data rate for the reverse link. In step S16, the base station 20 informs the final data rate to the mobile 10 via a paging signal. Here, the paging signal can include the selected data rate information obtained previously.

Finally, in step S17, upon receiving the final data rate from the base station 20, the mobile 10 transmits data to the base station 20 according to the final data rate. Here, it should be noted that the appropriate modulation and coding methods can be applied when transmitting data from the mobile 10 to the base station 20.

The present inventors recognized that further modifications and improvements to the above methods are possible.

Figure 2:
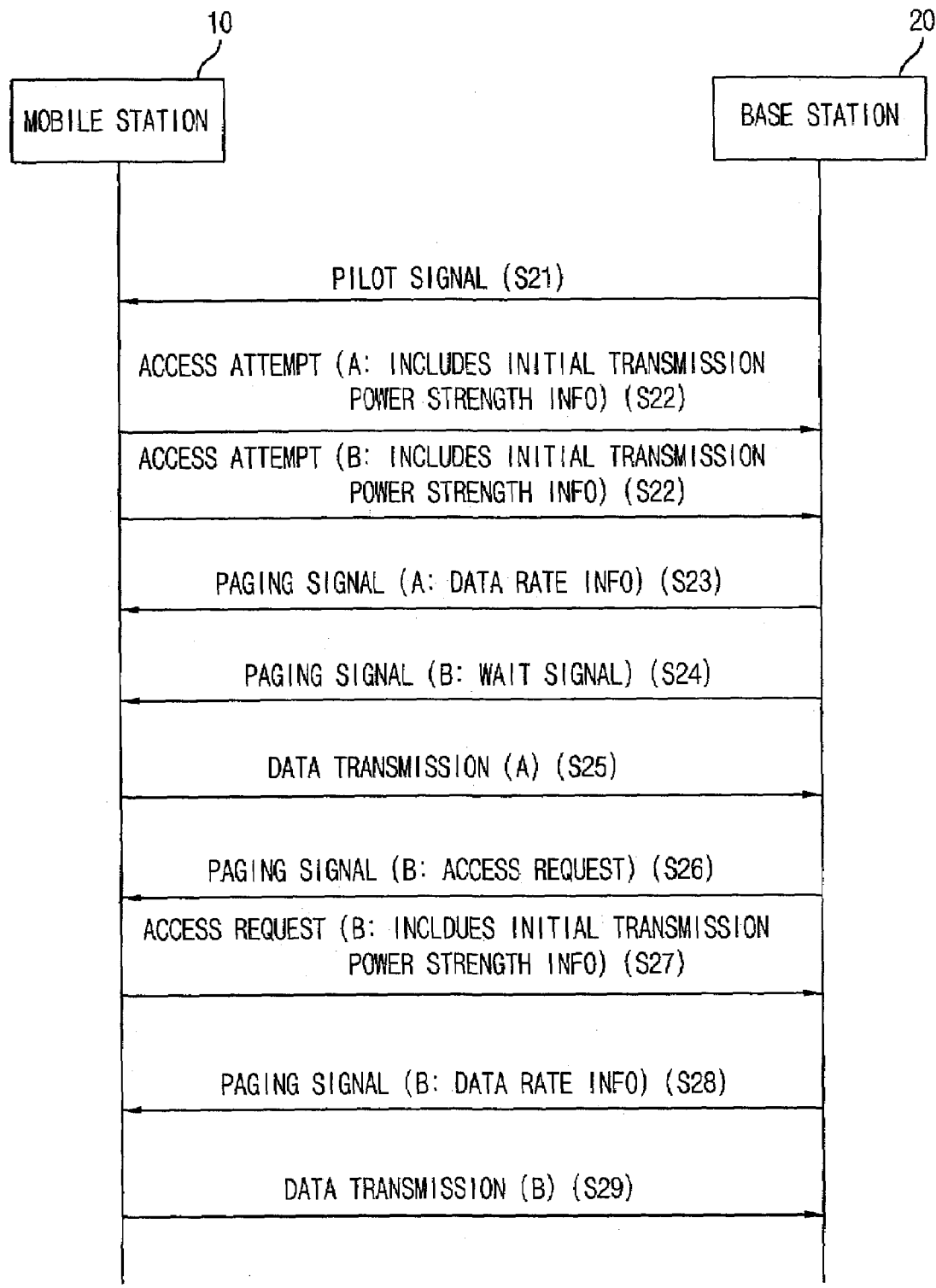
FIG. 2 shows the call processing procedures of a reverse link data transmission method when two or more users attempt to access the communications system according to the present invention.

For example, FIG. 2 shows the call processing procedures when two or more users (e.g., mobiles) attempt to access the mobile communications system simultaneously, or when a subsequent access attempt is made by the mobile while its is still transmitting data to the base station. According to the present invention, the base station preferably performs the above-described call processing method for only one user (mobile) and sets its data transmission rate, while the other users (mobiles) are set to wait. In other words, the users (mobiles) are prioritized so that their respective data transmission rates are established in a certain order.

In particular, when packet data transmission for a particular user (mobile) is complete, the base station sends out a paging message to the other mobiles requesting that the other mobiles attempt to re-access the base station. The process of prioritizing all or a specific number of users (mobiles) attempting to simultaneously access the base station can be repeated as necessary. When the mobile receives a paging message, the mobile performs modified open loop power control as it previously did during its access attempt. Also, the mobile, in response to the received paging message, sends to the base station a paging response message indicating its initial transmission power intensity as done during the access attempt. The base station receiving the paging response message then determines the appropriate data transmission rate for the reverse link as previously described, and informs the mobile of the data rate to be used. Accordingly, the mobile proceeds to transmit packet data in accordance with the data rate informed by the base station.

In step S21, the base station 20 sends a pilot signal received by two mobiles 10A, 10B. In step S22, each mobile 10A, 10B then simultaneously sends to the base station 20 an access message via an access channel in order to attempt access.

In steps S23 and S24, then the base station 20 sends a paging signal (message) to the mobiles 10A, 10B. The base station 20 sets one mobile 10A to receive data and includes data rate information in the paging signal sent thereto. The other mobile 10B is set by the base station 20 to be in a wait mode by including a wait signal in the paging signal sent to mobile 10B.

In step S25, the mobile 10A begins data transmission and sends to the base station 20 data signals using the data rate information. Then, in step S26, the base station 20 detects when the mobile 10A completes its data transmission, and sends to the other mobile 10B a paging signal requesting that the other mobile 10B send an access attempt signal.

In step S27, the mobile 10B, in response to the request, sends an access request signal that includes the initial transmission power strength information to the base station 20. Then, in step S28, the base station 20 determines the desired data transmission rate and sends this information via the paging channel to the mobile 10B.

Finally, in step S29, the mobile 10B sends data to the base station 20 according to the data transmission rate that was previously received in step S27. Here, it should be noted that the appropriate modulation and coding methods can be applied when transmitting data from the mobile 10 to the base station 20.

Thus, in the above manner of prioritizing the order in which various mobiles should transmit data to the base station, a plurality of mobiles can be effectively handled even when two or more mobiles attempt to access one base station in the mobile communications system.

As an additional modification, situations where a large amount of data needs to be transmitted is also considered and accommodated for by the present invention.

If a mobile needs to transmit a large amount of data, the overall time required for data transmission is lengthy. This results in several problems and disadvantages. For example, other users (mobiles) cannot access and transmit to the base station when one mobile is sending data to that base station. Also, the mobile communications environment and/or conditions are likely to change during the prolonged period of time required for the lengthy transmission, and thus the communications link may become disconnected.

To address these drawbacks, the present invention can restrict the time in which a mobile may transmit data to the base station. When a set time period is reached, the base station can discontinue or restrict the current transmission from a particular mobile, and can send a paging message to that mobile requesting the mobile to re-access the base station at a later time. Here, as would be understood by those skilled in the art, the restricted time period can be set according to the particular characteristics desired from the mobile communications system or other communication conditions. Also, the reaccessing can be set to be performed at various times in accordance with the communication system requirements.

Figure 3:
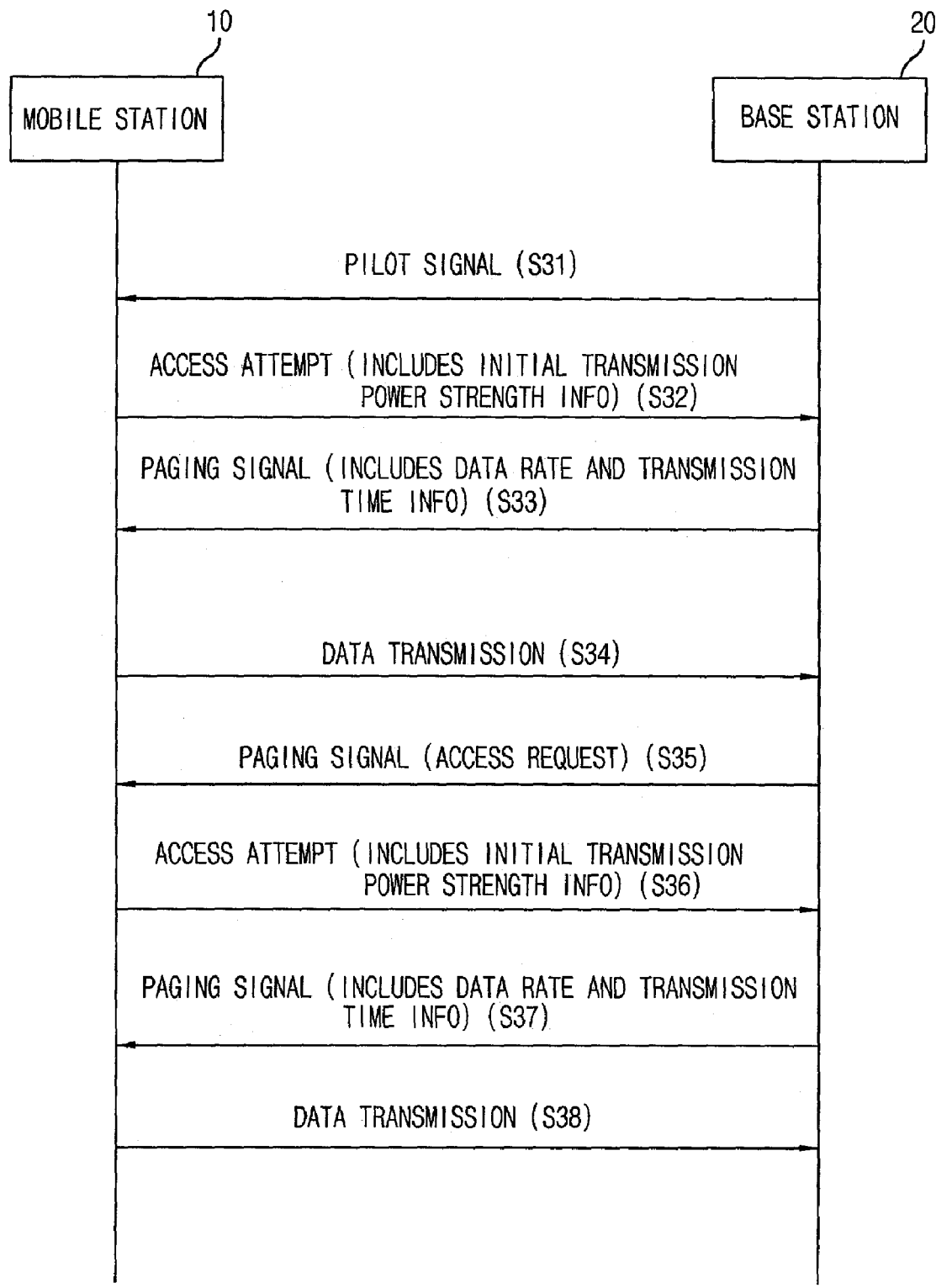
FIG. 3 shows the call processing procedures of a reverse link data transmission method when a large amount of data is to be transferred according to the present invention.

FIG. 3 shows an example of how to implement the time restriction requirement according to the present invention. Here, it should be noted that all steps and procedures can be equivalent to those of FIG. 2, explained previously, with the exception of the contents of the paging signals sent from the base station 20 to the mobiles 10A, 10B. Namely, transmission time information can be additionally sent to each mobile 10A, 10B so that a particular mobile has a certain time within which it can transmit data to the base station 20.

By restricting the time that a mobile can transmit data, other mobiles can be allowed to access the base station within a reasonable time so that a plurality of users (mobiles) may be handled effectively and efficiently. Also, the time restriction allows consideration of changes to the communications environment and conditions. The base station can frequently update and adjust the data transmission rate for the mobiles in a more effective and efficient manner considering more accurate and up-to-date mobile communication conditions and requirements. Here, it should be noted that the appropriate modulation and coding methods can be applied when transmitting data from the mobile 10 to the base station 20.

Figure 4:
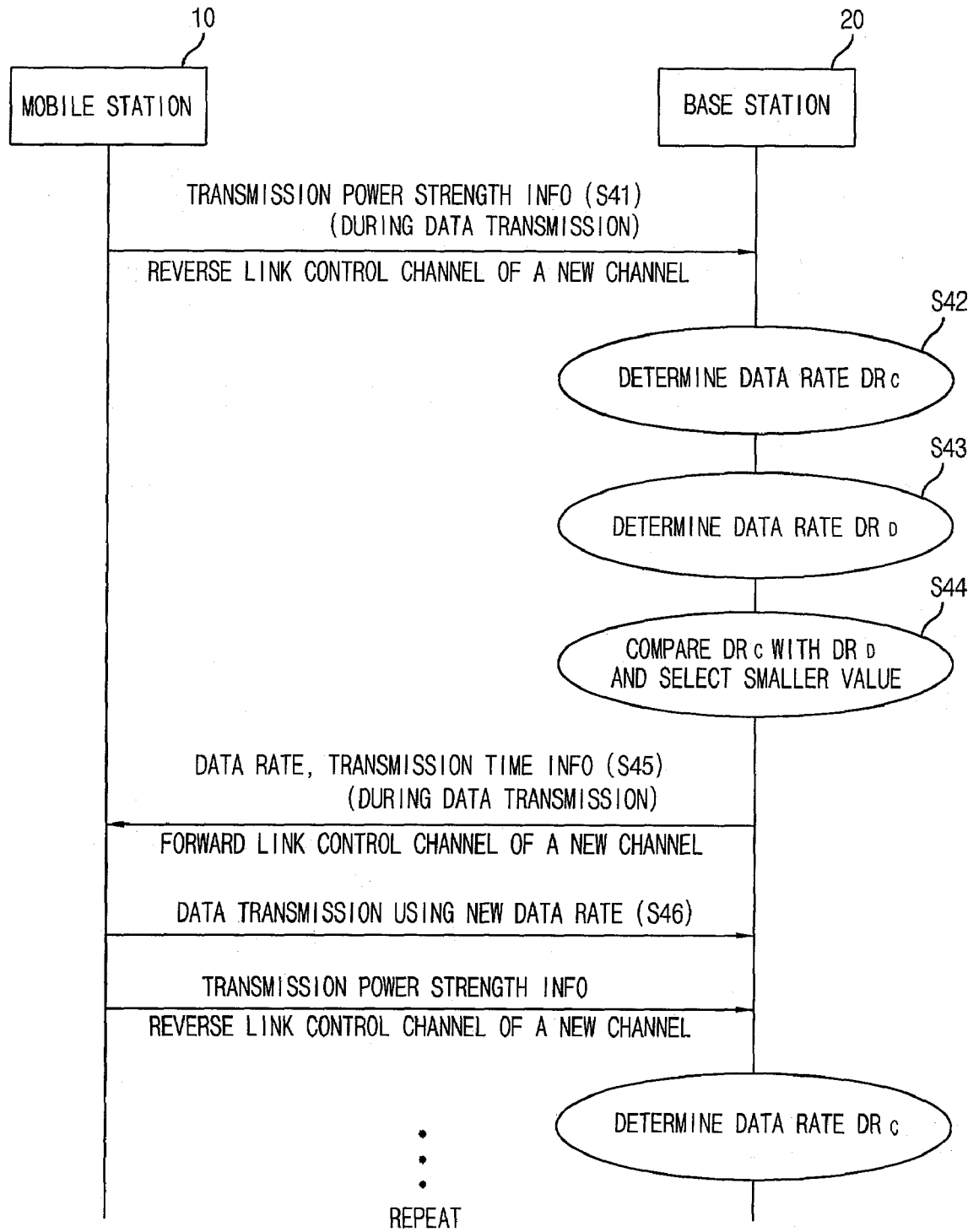
FIG. 4 shows the call processing procedures of a reverse link data transmission method to update the data transmission rate using a newly established channel when a large amount of data needs to be transferred according to the present invention.

FIG. 4 shows another method of minimizing the data transmission times when one mobile needs to transmit a large amount of data to the base station. In addition to existing communication channels, a reverse link control channel and a forward link control channel may be newly established when the mobile is currently in an active state, i.e., when the mobile is currently transmitting data to the base station.

When the mobile is currently transmitting data to the base station, a new control channel is established so that the mobile can subsequently receive a new reverse link data transmission rate from the base station for transmitting data during the next data transmission time period. As such, the mobile can be continuously receive different data transmission rate information, so that data transmissions on the reverse link made be performed by the mobile in a minimal amount of time.

Namely, the mobile 10 receives a reverse link data transmission rate and transmission time information from the base station 20, and begins transmitting data at the received data transmission rate until the allowed transmission time lapses. When the transmission end time approaches, the mobile 10 sends to the base station 20 via a newly established reverse link control channel, the current transmission power strength information, as shown in step S41.

In step S42, the base station 20 determines the reverse link data rate $DR_C$ using traffic call signals of the channel on which data is currently being sent, the transmission power information, and other information. At the same time, a load controller in the base station 20 determines another reverse link data rate $DR_D$ based upon the load on the traffic channel, as shown in step S43. Thereafter, the base station 20 compares $DR_C$ with $DR_D$, and sets the smaller of the two values as the final data rate of the reverse link, in step S44.

In step S45, the final data rate is sent by the base station 20 to the mobile 10 via the newly established forward link control channel. Then in step S46, the mobile 10 transmits data according to the new data rate after the data transmission during the previous period lapses. Thereafter, the above steps can be repeated as required so that data transmissions may continue until all of the desired data has been sent from the mobile 10 to the base station 20 on the reverse link. Here, it should be noted that the appropriate modulation and coding methods can be applied when transmitting data from the mobile 10 to the base station 20.

Figure 5:
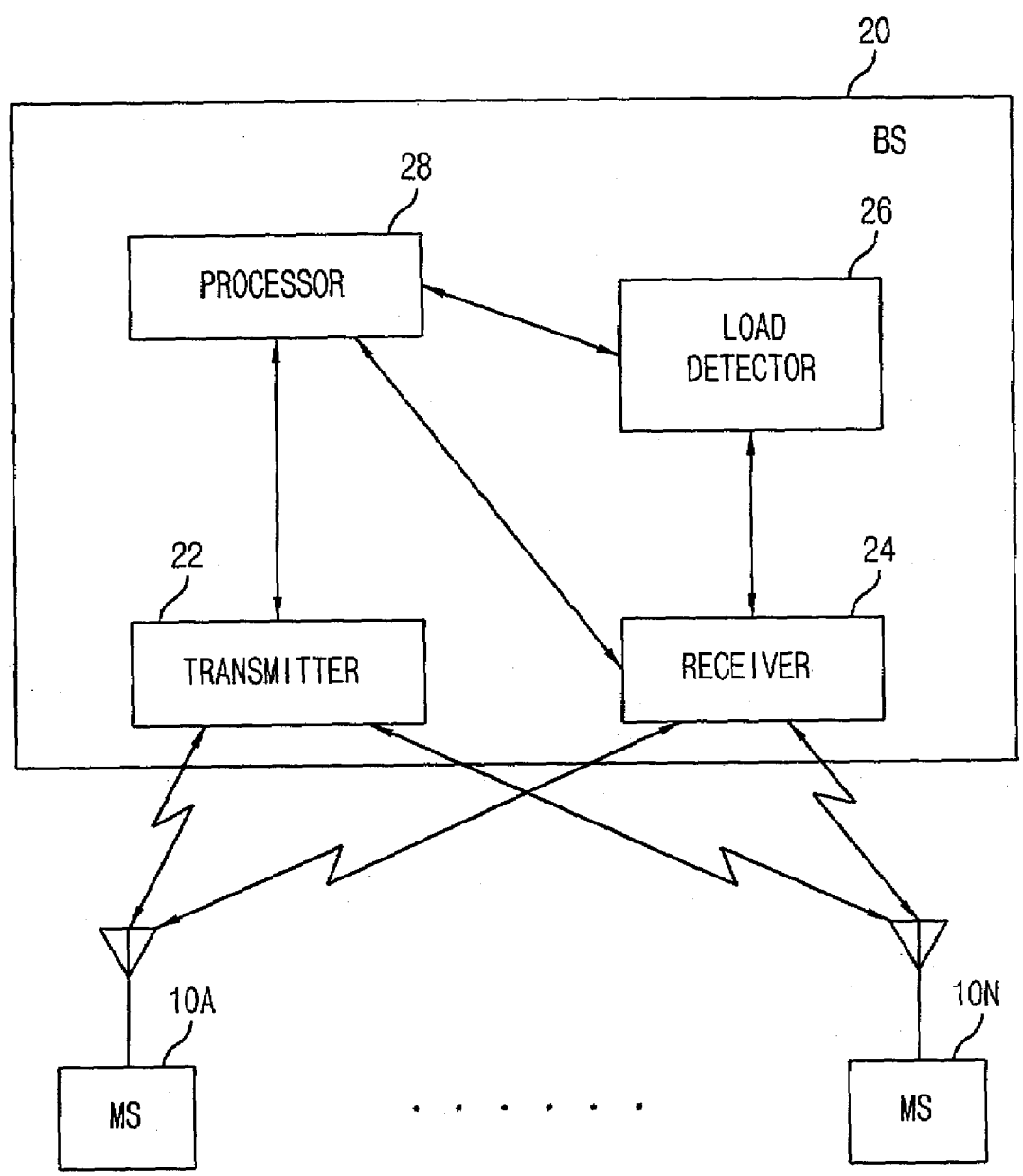
FIG. 5 shows the structure of a base station in a mobile communications system according to the present invention.

FIG. 5 shows the partial structure of a base station according to the present invention. A plurality of mobiles 10A through 10N can be served by the base station 20. The base station 20 of the present invention can comprise a transmitter 22, a receiver 24, a load detector 26, and a processor 28 that operatively cooperate to perform the call processing procedures shown in FIGS. 1 through 4.

For example, the transmitter 22 transmits a pilot signal at an initial power level. Then the receiver 24 receives via an access channel, an access signal having signal power level value related to the transmitted pilot signal. The load detector 26 operatively connected with the receiver 24 determines a signal load at the base station 20, and the processor 28 operatively connected with the transmitter 22, receiver 24, and load detector 26, determines a first data rate value based upon the signal power level value of the access signal and an actual signal power level detected from the access channel, for determining a second data rate value based upon the detected signal load, and comparing the first and second data rate values to select a smaller value thereof. Here, the transmitter 22, based upon the selecting by the processor 28, transmits a paging signal including the selected data rate value, and the receiver 24 receives data transmitted according to the selected data rate value.

As described above, in accordance with the present invention, the conventional open loop power control method is modified so that the transmission power strength (intensity) is constant during the access process. By transmitting access messages to the mobiles, the base station can determine or estimate the wireless channel environment or conditions for the reverse link. Based upon the determined or estimated channel condition, the most appropriate modulation and coding methods can be adaptively employed to maximize packet data transfers on the reverse link to efficiently handle a plurality of users (mobiles) in a mobile communications system.

The present invention has been described above with respect to variations in data transmission techniques between a base station and mobile station served by the base station, focusing on transmissions on the reverse link in a next generation CDMA system. However, it will be understood that the invention can be advantageously applied to other situations including transmissions on other types of channels and other mobile communication systems being developed for handling data packet transmissions.

This specification describes various illustrative embodiments of a method and device of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

What is claimed is:

1. A system for transmitting data on a reverse link channel comprising:
   a transmitter for transmitting a pilot signal at a constant power level;
   a receiver for receiving via an access channel, an access message having a signal power level value related to the transmitted pilot signal;
   a load detector operatively connected with the receiver for determining a signal load at a base station; and
   a processor operatively connected with the transmitter, the receiver, and the load detector for determining a first data rate value based upon the signal power level value of the access signal and an actual signal power level detected from the access channel, for determining a second data rate value based upon the detected signal load, and comparing the first and second data rate values to select a smaller value thereof,
   wherein the transmitter, based upon the selecting by the processor, transmits a paging signal including the selected data rate value, and the receiver receives data transmitted according to the selected data rate value.

2. The system of claim 1, wherein,
   the receiver receives an access signal from two or more mobile stations, respectively,
   the processor assigns priority levels to the mobile stations that sent access signals to the receiver, and
   the transmitter, under control of the processor, transmits a first paging signal including the selected data rate value to the mobile station with a highest priority, and a second paging signal including a wait command to all remaining mobile stations.

3. The system of claim 2, wherein the receiver receives data from the mobile station with the highest priority.

4. The system of claim 3, wherein the transmitter, under control of the processor, transmits a first paging signal including the selected data rate value to the mobile station with a next highest priority, and a second paging signal including a wait command to all remaining mobile stations.

5. The system of claim 4, wherein the receiver receives data from the mobile stations transmitting data in order of their assigned priority levels.

6. The system of claim 1, wherein the paging signal sent by the transmitter also includes a transmission time limit.

7. The system of claim 6, wherein,
   the receiver receives an access signal from two or more mobile stations, respectively,
   the processor assigns priority levels to the mobile stations that sent access signals to the receiver, and
   the transmitter, under control of the processor, transmits a first paging signal including the selected data rate value to the mobile station with a highest priority, and a second paging signal including a wait command to all remaining mobile stations.

8. The system of claim 7, wherein the receiver receives data from the mobile station with the highest priority during the transmission time limit.

9. The system of claim 8, wherein the transmitter, under control of the processor, transmits a first paging signal including the selected data rate value to the mobile station with a next highest priority, and a second paging signal including a wait command to all remaining mobile stations.

10. The system of claim 9, wherein the receiver receives data from the mobile stations transmitting data in order of their assigned priority levels during the transmission time limit of each mobile station.

11. The system of claim 10, wherein the processor determines and selects one of the first or second data rate values for a mobile station with the next highest priority while data transmission being performed by a previously selected mobile station is still in progress.

12. A system for transmitting data on a reverse link channel comprising:
   a receiver for receiving via a reverse link control channel, a mobile station signal transmitted at a certain signal power level;
   a load detector operatively connected with the receiver for determining a signal load at a base station;
   a processor operatively connected with the receiver and the load detector for determining a first data rate value based upon the signal power level of the mobile station signal and an actual signal power level detected from a newly established channel, for determining a second data rate value based upon the detected signal load, and comparing the first and second data rate values to select a smaller value thereof; and
   a transmitter operatively connected with the processor for transmitting the selected data rate value to the mobile station via a forward link control channel, and the receiver receives data transmitted according to the selected data rate value.

13. A method for transmitting data on a reverse link channel comprising:
   estimating a channel environment on the reverse link based on a signal power level on a received message;
   determining a first data rate based on the signal power level on the received message;
   determining a second data rate based signal load at a base station;
   determining a third data rate by selecting a smaller one of the determined first data rate and the determined second data rate;
   sending the third data rate to a mobile station; and
   receiving data on the reverse link transmitted at the determined third data rate.

14. The method of claim 13, wherein the estimating is performed by fixing a transmit power of the mobile station.

15. The method of claim 13, wherein the estimating is performed by sending transmit power information from the mobile station to the base station.

16. The method of claim 13, wherein the estimating is performed by using a maximum transmission rate of the mobile station based upon a remaining power at the mobile station when the mobile station is in an active state.

17. The method of claim 13, further comprising selecting a particular mobile station for data transmission, while other mobile stations are set to wait.

18. The method of claim 17, wherein all mobile stations are given a priority so that each mobile station transmits data to the base station successively in turn.

19. The method of claim 17, wherein the selected mobile station transmits data during a limited time period, and the other mobile stations are sequentially selected to transmit data after the limited time period lapses.

20. The method of claim 13, wherein the mobile station transmits data at a current data rate during a current transmit time period, and before the current transmit time period ends, obtaining a new data rate from the base station appropriate for transmitting data during a subsequent transmit time period.

21. The method of claim 13, wherein the data transmitted on the reverse link at the determined data rate has a modulation mode and/or channel coding adaptively applied thereto.

22. A method for transmitting data on a reverse link channel comprising:
setting a mobile station transmission power based on an initial open loop power control;
informing a base station of the set transmission power;
transmitting data to the base station at the set transmission power;
detecting a signal reception power from an access channel used by a mobile station;
detecting a channel environment from an access message received from the mobile station;
determining a first data rate for the reverse link based on the signal reception power of the mobile station and the detected channel environment;
obtaining a second data rate for the reverse link from a load controller;
comparing the first data rate with the second data rate;
setting a smaller value among the first data rate and the second data rate in accordance with the comparison as a final data rate;
informing the mobile station of the final data rate; and
receiving data transmitted from the mobile station at the final data rate.

23. The method of claim 22, wherein, if more than one mobile station simultaneously transmits data to the base station, the detecting is performed for a single mobile station while the performing of the detecting for the other mobile station or stations are deferred.

24. The method of claim 23, further comprising:
paging the other mobile station or stations, after the processing for the single mobile station is complete; and
performing the detecting and subsequently processing for the other mobile station or stations to determine a data rate for transmission on the reverse link there for.

25. The method of claim 24, wherein additional open power loop control is not performed for the other mobile station or stations.

26. The method of claim 24, further comprising setting a time limit on the data transmissions from each mobile station.

27. A method for transmitting data on a reverse link channel comprising:
transmitting a mobile station signal of a certain power level via a newly established reverse link control channel;
receiving, via a forward link control channel, data rate information based on a smaller one of a first data rate value and a second data rate value, the first data rate value being based upon the signal power level of a mobile station message and a mobile station signal power level detected from the newly established reverse link control channel, and the second data rate value being based upon a detected signal load; and
transmitting traffic data according to a modulation mode or a coding rate determined by the data rate information.

28. A method for transmitting data on a reverse link channel comprising:
transmitting transmission power information of a mobile station via a newly established reverse link control channel;
receiving data rate information determined by a smaller one of a first data rate and a second data rate, the first data rate based on transmission power information and a signal power level detected from a traffic channel via a forward link control channel, and the second data rate based on a signal load at a base station; and
transmitting traffic data according to a modulation mode or a coding rate determined by the data rate information.

29. The system of claim 1, wherein the processor determines the first data rate value, determines the second data rate value and compares the first data rate value and the second data rate value during a single call processing procedure.

30. The system of claim 12, wherein the processor determines the first data rate value, determines the second data rate value and compares the first data rate value and the second data rate value during a single call processing procedure.

31. The system of claim 12, wherein the newly established channel is different than the reverse link control channel.

32. The method of claim 13, wherein estimating the channel environment includes receiving an access message via an access channel, the access message having the signal power level value related to a transmitted pilot signal.

33. The method of claim 32, wherein determining the first data rate includes determining a first data rate value based upon the signal power level value of the access signal and the actual signal power level detected from the access channel.

34. The method of claim 13, wherein determining the first data rate and the second data rate includes:
determining the first data rate for the reverse link based on the signal reception power of the mobile station and the estimated channel environment;
obtaining the second data rate for the reverse link from a load controller;
comparing the first data, rate with the second data rate; and
setting a smaller value among the first data rate and the second data rate in accordance with the comparison as a final data rate.

* * * * *